US010060007B2

(12) United States Patent
Miettinen et al.

(10) Patent No.: US 10,060,007 B2
(45) Date of Patent: Aug. 28, 2018

(54) METHOD OF PREPARING A GOLD-CONTAINING SOLUTION AND PROCESS ARRANGEMENT FOR RECOVERING GOLD AND SILVER

(71) Applicant: OUTOTEC (FINLAND) OY, Espoo (FI)

(72) Inventors: Ville Miettinen, Lappeenranta (FI); Riina Ahtiainen, Pori (FI); Kari Valkama, Pori (FI); Erkki Paatero, Helsinki (FI); Kari Hietala, Espoo (FI); Mika Haapalainen, Pori (FI)

(73) Assignee: Outotec (Finland) Oy, Espoo (FI)

( * ) Notice: Subject to any disclaimer, the term of this patent is extended or adjusted under 35 U.S.C. 154(b) by 303 days.

(21) Appl. No.: 14/787,404

(22) PCT Filed: Apr. 29, 2014

(86) PCT No.: PCT/FI2014/050309
§ 371 (c)(1),
(2) Date: Oct. 27, 2015

(87) PCT Pub. No.: WO2014/177765
PCT Pub. Date: Nov. 6, 2014

(65) Prior Publication Data
US 2016/0068927 A1 Mar. 10, 2016

(30) Foreign Application Priority Data
Apr. 30, 2013 (FI) .................................... 20135448

(51) Int. Cl.
*C22B 3/00* (2006.01)
*C22B 11/00* (2006.01)
(Continued)

(52) U.S. Cl.
CPC .............. *C22B 11/04* (2013.01); *C22B 1/005* (2013.01); *C22B 1/02* (2013.01); *C22B 3/0005* (2013.01);
(Continued)

(58) Field of Classification Search
CPC ......... C22B 2/005; C22B 7/006; C22B 11/04; C22B 11/06; C22B 3/005
See application file for complete search history.

(56) References Cited

U.S. PATENT DOCUMENTS 4,053,305 A 10/1977 Smyres et al.
4,551,213 A 11/1985 Wilson
(Continued)

FOREIGN PATENT DOCUMENTS

CN 1137067 A 12/1996
CN 1186523 A 7/1998
(Continued)

OTHER PUBLICATIONS

PCT, International Search Report for International Patent Application No. PCT/FI2014/050309, dated Aug. 28, 2014 (Aug. 28, 2014), pp. 4.
(Continued)

*Primary Examiner* — George Wyszomierski
*Assistant Examiner* — Tima M McGuthry-Banks
(74) *Attorney, Agent, or Firm* — Chernoff Vilhauer LLP

(57) ABSTRACT

The invention relates to a method for preparing a gold-containing solution by chloride leaching from gold-bearing raw materials. A further object of the invention is to provide a method for recovering gold and optionally silver from the prepared gold-containing solution. The invention relates also to a process arrangement for recovering gold and optionally silver.

27 Claims, 6 Drawing Sheets

(51) Int. Cl.
*C22B 11/06* (2006.01)
*C22B 3/26* (2006.01)
*C22B 1/00* (2006.01)
*C22B 1/02* (2006.01)
*C22B 3/12* (2006.01)
*C22B 3/18* (2006.01)
*C22B 3/22* (2006.01)
*C22B 7/00* (2006.01)

(52) U.S. Cl.
CPC ............... *C22B 3/12* (2013.01); *C22B 3/18* (2013.01); *C22B 3/22* (2013.01); *C22B 7/008* (2013.01); *C22B 11/042* (2013.01); *C22B 11/06* (2013.01); *Y02P 10/234* (2015.11); *Y02P 10/238* (2015.11)

(56) References Cited

U.S. PATENT DOCUMENTS

| | | | |
|---|---|---|---|
| 4,655,829 A | 4/1987 | Cashman | |
| 7,799,114 B2 * | 9/2010 | Haavanlammi | C22B 3/10 423/38 |
| 7,858,056 B2 * | 12/2010 | Moyes | C22B 3/10 205/570 |
| 2007/0014709 A1 | 1/2007 | Moyes et al. | |
| 2009/0241735 A1 * | 10/2009 | Abe | C22B 3/24 75/744 |

FOREIGN PATENT DOCUMENTS

| | | |
|---|---|---|
| CN | 1732277 A | 2/2006 |
| WO | 2005106052 A1 | 11/2005 |
| WO | 2007093666 A1 | 8/2007 |
| WO | WO-2009068735 A1 * | 6/2009 |
| WO | 2011154603 A1 | 12/2011 |

OTHER PUBLICATIONS

Notification of the First Office Action prepared by the Intellectual Property Office of the People's Republic of China for CN201480028817.8, dated Jan. 11, 2017, 18 pages.

* cited by examiner

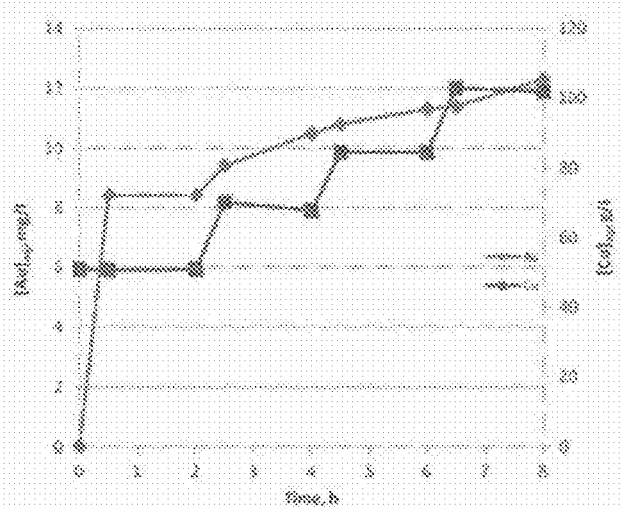

Figure 2. Gold concentration of the solution vs. copper concentration in test 3 of Example 1: $[Cu]_{aq}$=50-100 g/l, $[NaBr]_{aq,0}$=100 g/l, $[CaCl_2]_{aq,0}$=177 g/l, acid concentration >10 g/l (HCl), $T$=98°C, oxygen feed 500-2000 ml/min, and solid concentration 200 g/l.

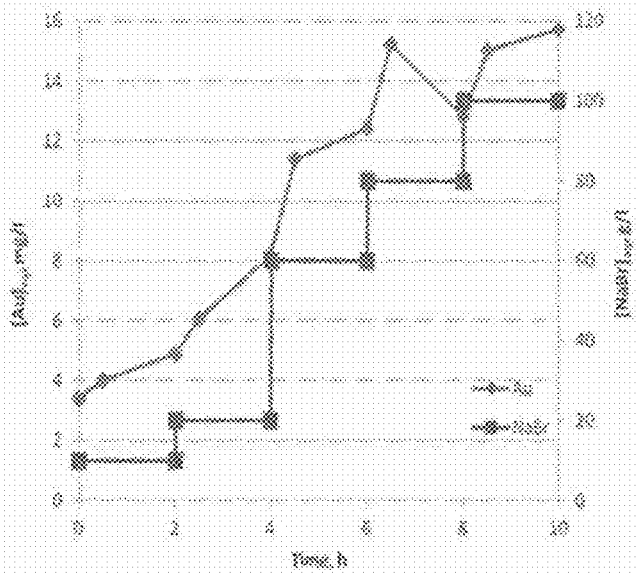

Figure 3. Gold concentration of the solution vs. bromide concentration in test 4 of Example 1: $[Cu]_{aq,0}$=100 g/l, $[NaBr]_{aq}$=10-100 g/l, $[CaCl_2]_{aq,0}$=177 g/l, acid concentration >10 g/l (HCl), $T$=98°C, oxygen feed 220 ml/min, and solid concentration 200 g/l.

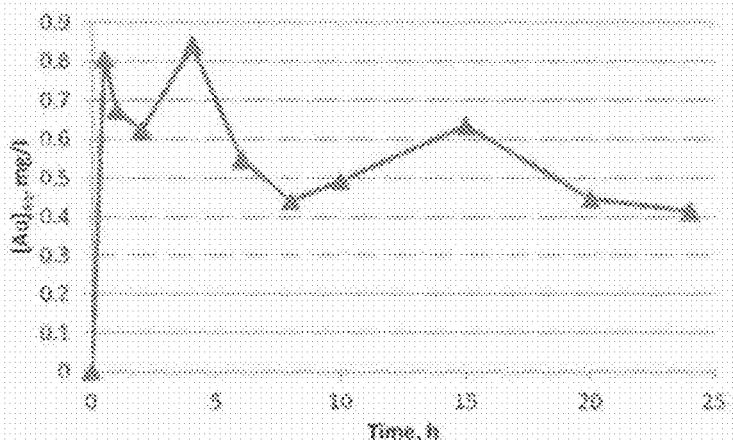

Figure 4. Gold concentration of the solution vs. leaching time in test 1 of Example 2: $[Cu]_{aq,0}$=100 g/l, $[NaBr]_{aq}$=10-100 g/l, $[CaCl_2]_{aq,0}$=177 g/l, pH=1.7, $T$=98°C, oxygen feed 2 l/min, and solid concentration 200 g/l.

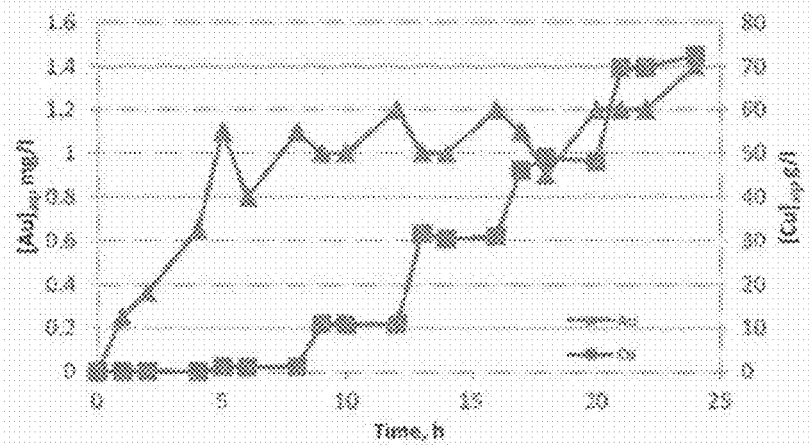

Figure 5. Gold concentration of the solution vs. copper concentration in test 3 of Example 2: $[Cu]_{aq,0}$=0-75 g/l, $[NaBr]_{aq}$=100 g/l, $[CaCl_2]_{aq,0}$=177 g/l, pH=1.7, $T$=98°C, oxygen feed 2 l/min, and solid concentration 400 g/l.

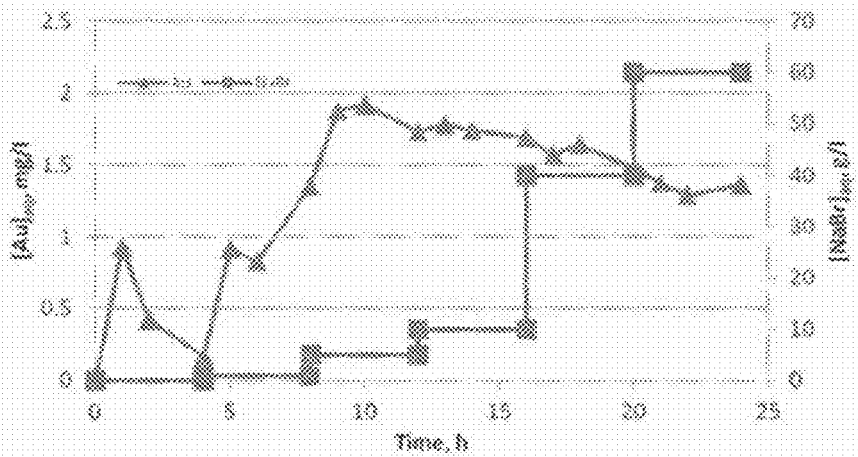
Figure 6. Gold concentration of the solution vs. bromide concentration in test 4 of Example 2: $[Cu]_{aq,0}$=100 g/l, $[NaBr]_{aq}$=0-60 g/l, $[CaCl_2]_{aq,0}$=177 g/l, pH=1.7, $T$=98°C, oxygen feed 2 l/min, and solid concentration 400 g/l.
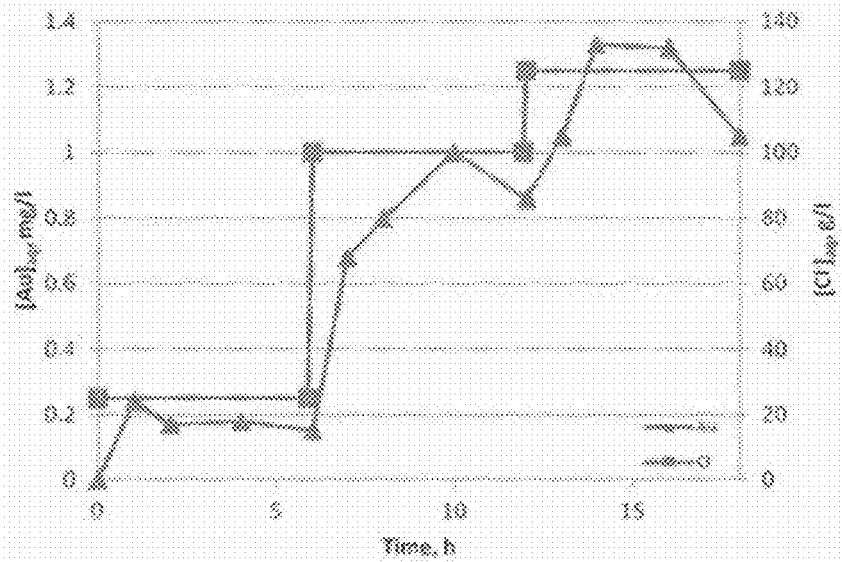
Figure 7. Gold concentration of the solution vs. chloride concentration in test 5 of Example 2.

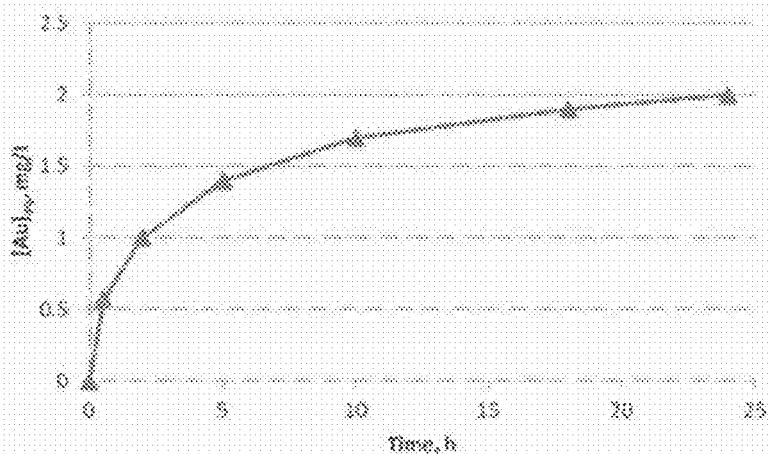

Figure 8. Gold concentration of the solution in cyanide test in Example 3: $[NaCN]_{aq}$=3 g/l, pH=11, $T$=25°C, solid concentration 33 w-%, and air feed 0.5 ml/min.

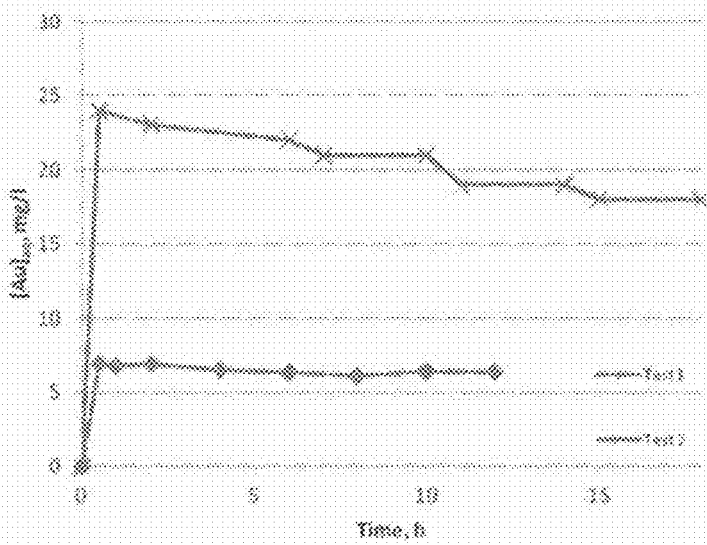

Figure 9. Gold concentrations vs. leaching time in tests 1 and 2 of Example 3. Test 1: $[Cu^{2+}]_{aq,0}$=100 g/l, $[NaBr]_{aq,0}$=100 g/l, $[Cl^-]_{aq,0}$=225 g/l, $[solid]_0$=50 g/l, pH=1.7, $T$=98 °C, oxygen feed 1.5 l/min, and material from POX test 1. Test 2: $[Cu^{2+}]_{aq,0}$=20 g/l, $[NaBr]_{aq,0}$=8-100 g/l, $[Cl^-]_{aq,0}$=150 g/l, $[solid]_0$=315 g/l, $[acid]_{HCl}$=10 g/l, $T$=98 °C, oxygen feed 2 l/min, and material from POX test 1.

METHOD OF PREPARING A GOLD-CONTAINING SOLUTION AND PROCESS ARRANGEMENT FOR RECOVERING GOLD AND SILVER

CROSS-REFERENCE TO RELATED APPLICATIONS

This is a national stage application filed under 35 USC 371 based on International Application No. PCT/FI2014/050309 filed Apr. 29, 2014 and claims priority under 35 USC 119 of Finnish Patent Application No. 20135448 filed Apr. 30, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Not Applicable.

FIELD OF THE INVENTION

The present invention relates to a method for preparing a gold-containing solution by chloride leaching from gold-bearing raw materials. A further object of the invention is to provide a method for recovering gold and optionally silver from the prepared gold-containing solution. The invention relates also to a process arrangement for recovering gold and optionally silver.

BACKGROUND OF THE INVENTION

Nowadays cyanide leaching is considered as the best option for leaching gold from gold-containing ores and concentrates. Another option is chloride leaching, but even though the use of chloride for gold leaching has been known for a long time, it has not been extensively applied in commercial practice. Chloride leaching has been considered too expensive due to relatively high reagent (oxidant) consumptions. The recovery of gold from chloride leach solutions has also been considered challenging, and the recovery yield has been lower than in cyanide leaching. Furthermore, there are corrosion problems because of high chloride concentrations of the leaching solutions.

U.S. Pat. No. 4,551,213 discloses a method of recovering gold values from sulphur-containing ore mixtures by leaching with chlorides (alkali metal chloride and/or alkali earth metal chloride), oxidizing agent (chloride gas) and cupric or ferric chloride. It is recited that the concentration of chloride in the leaching may be 12 to 47 weight-% and the concentration of cupric or ferric chloride 3.5 to 27 weight-%. A leaching temperature of about 20 to 106° C., preferably about 40 to 80° C., is disclosed. In the examples, the leaching is performed at a temperature of 60 to 65° C. The sulphur-containing ore used as the starting material may be obtained from hydrometallurgical processing of copper, for example. Gold may be recovered from the leach solution electrolytically or by adsorption on carbon.

EP 1 583 848 B1 discloses a process for recovering precious metals, such as gold, from sulfidic materials, by leaching with a mixture containing a mixture of halides and multivalent metal compounds selected from copper, iron, cobalt, manganese and vanadium compounds. Typical starting materials for the process are refractory gold concentrates, such as arsenopyrite (optionally with pyrite and/or with carbon). The mixture of halides in the leaching preferably comprises chloride and bromide. The multivalent metal in the metal halide leaching solution is typically copper ($Cu^{2+}$). The leaching may be performed at a temperature of 90-105° C. Leaching pH values in the range of less than 1 but greater 0.2 are disclosed. The precious metal may be recovered from the each solution by adsorption on carbon (activated carbon), or by on exchange, solvent extraction, etc. From the recovery stage, the solution is typically recycled to the leaching stage.

According to Examples 1-3 of EP 1 583 848 81, gold was recovered from a single refractory Au concentrate by a two-step or one-step leaching process at a temperature of 105° C. with a leach solution comprising NaCl, $CaCl_2$, Cu (from $CuCl_2$) and HCl.

CA 2 599 174 discloses a method of leaching gold from copper sulphide ores, where the sulphide ore is first subjected to leaching of copper, followed by leaching gold from the leach residue with a leach liquor containing chloride ions and ferric and ferrous ions. It is also recited that the rate of gold leaching reaction can be enhanced by the co-presence of either copper or bromide on or both together in the leach liquor. A leaching temperature of 80° C. or more is disclosed. According to Example 6, copper is first leached from a copper sulphide concentrate, whereafter gold was extracted from the leach residue with a leach liquor containing Cu, Cl and Br at a temperature of 85° C.

Further processes for gold recovery have been disclosed in the textbook "The Chemistry of Gold Extraction", J. Marsden and lain House. Society for Mining. Metallurgy and Exploration Inc., 2006, p. 275. These processes include a commercial leaching process of a silver-bearing material at 75° C. with a near-saturated solution of sodium chloride with hydrochloric acid (pH 0.3) and 15 g/l ferric ion as the oxidant. A further process comprises an atmospheric leaching process using NaCl and NaOCl at pH 7 from gold ores containing cyanide-soluble copper. A still further process consists of high temperature (200 to 225° C.) pressure oxidation in sulphate media containing 5 to 20 g/l NaCl, particularly proposed for gold-bearing starting materials containing by-products such as copper, nickel, and platinum group metals.

WO 2011/154603 A1 (15 Dec. 2011) discloses a method of recovering gold by solvent extraction from an acidic chloride-containing aqueous solution or from a slurry containing gold-bearing solids. The solvent extraction is performed with an extractant containing a diester of 2,2,4-trialkyl-1,3-pentanediol. The gold-bearing organic solution obtained from the extraction is scrubbed with an acidic aqueous solution, after which gold is stripped into water, from where it is reduced to form pure gold.

BRIEF DESCRIPTION OF THE INVENTION

An object of the present invention is to provide an improved method for preparing a gold-containing solution by chloride leaching from gold-bearing raw materials. A further object of the invention is to provide a method for recovering gold from the prepared gold-containing solution by liquid-liquid extraction. The objects of the invention are achieved by a method and a process arrangement, which are characterized by what is stated in the independent claims. The preferred embodiments of the invention are disclosed in the dependent claims. A further object of the invention is to provide a process arrangement for recovering gold and silver.

The invention is based on selecting a suitable chloride-based leaching solution and suitable leaching conditions for dissolving gold from gold-bearing raw materials with good yield. More specifically, the invention is based on applying a specific chloride based leaching solution and the optimized leaching conditions for dissolving gold from gold-bearing raw materials with good yield. The method of the invention may be combined with efficient circulation of the chloride-based leaching solution. Gold can then be conveniently recovered from the gold-containing leach solution by different methods, such as liquid-liquid extraction.

The method of the invention provides an economical and efficient way of recovering gold by chloride-based leaching from a wide variety of gold-bearing raw materials, such as gold ores and concentrates, contrary to the current prejudices in the field against the application of chloride-based processes for gold leaching. Besides gold, silver can be conveniently recovered in the same process.

The present method and process arrangement are suitable for a wide variety of starting materials. This is achieved by performing an evaporation step and a circulation step and thus there is no need to add additional copper ions to the process. This further enables the use of a wide variety of starting materials in a very sustainable way because no new copper is added (or needed to be present in the starting material) and therefore no copper-containing bleed to the environment is formed. Furthermore the chemicals circulation in the process is maximized resulting in savings in costs as well as small chemicals consumption.

BRIEF DESCRIPTION OF THE SEVERAL VIEWS OF THE DRAWINGS

In the following the invention will be described in greater detail by means of preferred embodiments with reference to the attached drawings, in which

FIG. 2 depicts the effect of the copper concentration on the gold concentration in the each solution of test 3 of Example 1;

FIG. 3 depicts the effect of the bromide concentration on the gold concentration in the leach solution of test 4 of Example 1;

FIG. 4 depicts the effect of the leaching time on the gold concentration in the leach solution of test 1 of Example 2;

FIG. 5 depicts the effect of the copper concentration on the gold concentration in the leach solution of test 3 of Example 2;

FIG. 6 depicts the effect of the bromide concentration on the gold concentration in the leach solution of test 4 of Example 2;

FIG. 7 depicts the effect of the chloride concentration on the gold concentration in the leach solution of test 5 of Example 2;

FIG. 8 depicts the gold concentration in the leach solution vs. leaching time in the comparative cyanide test of Example 3;

FIG. 9 depicts the effect of the leaching time on the gold concentration in the each solution of tests 1 and 2 of Example 3;

DETAILED DESCRIPTION OF THE INVENTION

Figure 1:
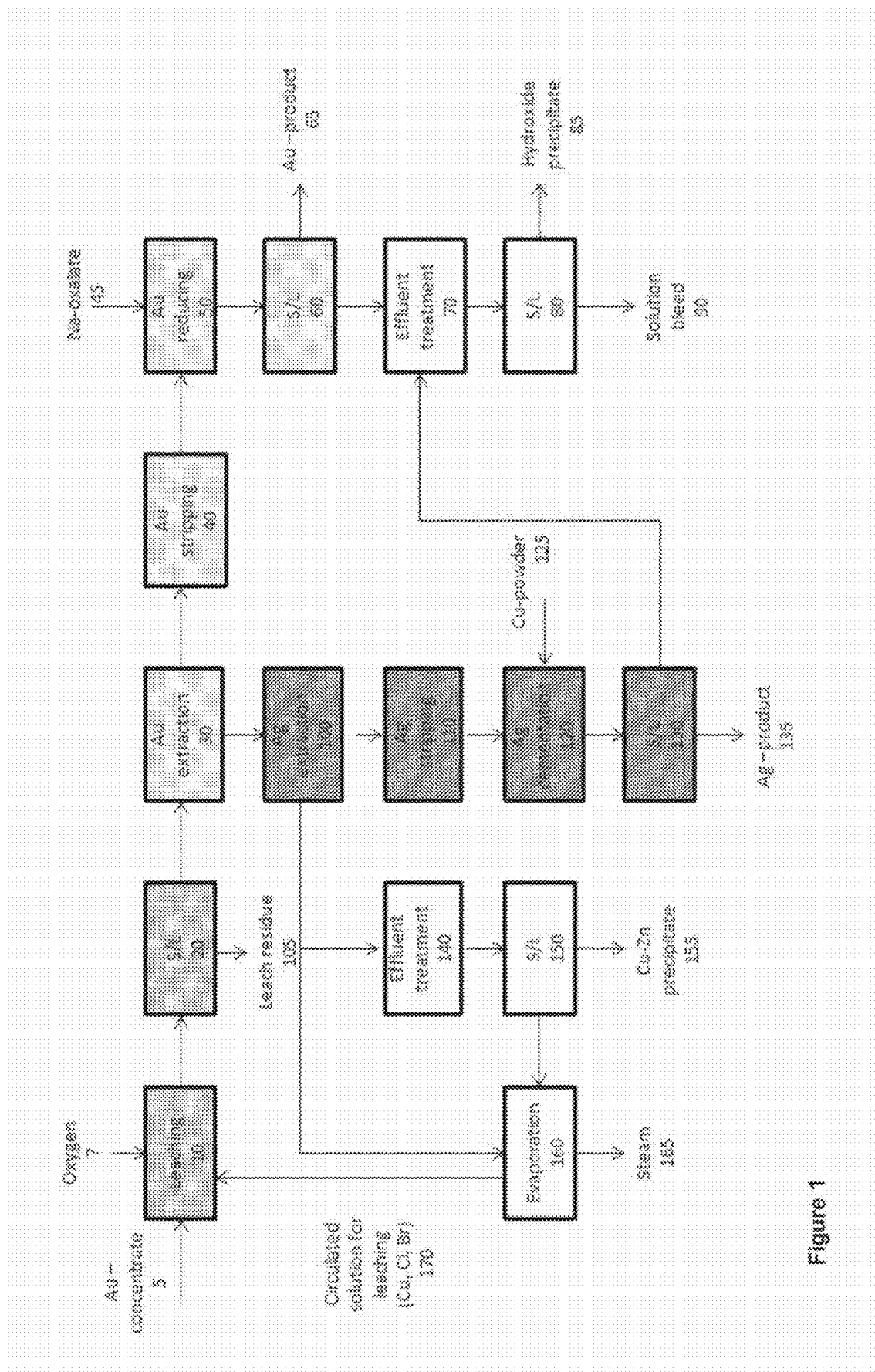
FIG. 1 is a block diagram of an exemplary embodiment of the invention, showing also silver recovery.
Figure 10:
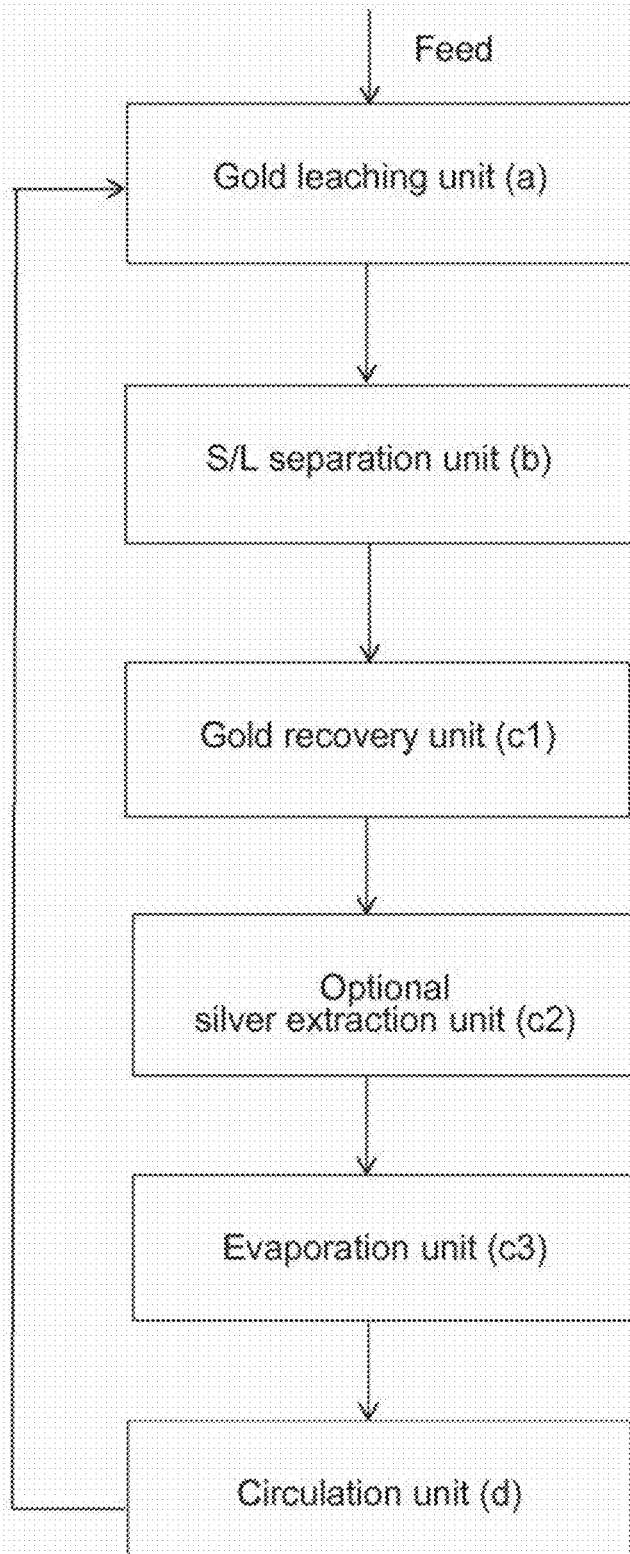
FIG. 10 is an example embodiment of the process arrangement.

The invention relates to a method of preparing a gold-containing solution from gold-bearing raw materials, wherein the method comprises
(a) a gold leaching step, wherein the gold-bearing raw material is subjected to oxidative chloride leaching in an aqueous leaching liquor in the following conditions:
(i) the aqueous leaching liquor contains dissolved cupric ions ($Cu^{2+}$), chloride ($Cl^-$) and bromide ($Br^-$),
(ii) pH is within a range wherein the cupric ion does not precipitate,
(iii) the oxidation potential is at least 450 mV Pt vs. Ag/AgCl, to provide a gold-containing solution optionally further containing silver,
(b) a liquid/solid separation step, wherein the gold-containing solution is separated from the undissolved solid material;
(c) a gold recovery step, wherein gold is recovered from the gold-containing solution from step (b) to obtain a gold-bearing organic solution and a gold-depleted leach solution containing $Cu^{2+}$, $Cl^-$ and $Br^-$; and
(c') an evaporation step, wherein gold-depleted leach solution from step (c) containing $Cu^{2+}$, $Cl^-$ and $Br^-$ is evaporated for removing excess water; and
(d) a circulation step, wherein the gold-depleted leach solution obtained from the evaporation step containing $Cu^{2+}$, $Cl^-$ and $Br^-$ is circulated to the leaching step (a).

Starting Materials

The gold-bearing raw materials for the method of the invention may be selected from ores, concentrates, scraps, recycled materials, leach residues, tailings, such as flotation tailings, and refractory gold materials, which refractory gold materials have been pretreated by pressure oxidation, roasting and/or bacterial leaching. The gold-bearing raw materials used as the starting material in the present invention may also contain silver.

Typically, the starting materials for the method of the invention may be selected from free-milling gold ores/concentrates and pretreated refractory gold concentrates.

Free-milling gold ores/concentrates refer to materials, from which gold can be recovered using cyanide leaching or physical separation methods. Free-milling materials can be sulfidic or oxidic ores. The main minerals of sulfidic ores are pyrite and pyrrhotite. The oxidic ores mainly contain silicates and ferric/ferrous oxides.

Refractory gold concentrates refer to materials, wherein the gold recovery in conventional cyanide leaching process is less than 80%. In most refractory gold concentrate materials, gold is associated with sulphide minerals as very fine inclusions or as invisible gold in the mineral lattice. Decomposition of gold-bearing minerals is required for gold liberation. Examples of refractory gold concentrates are ores based on arsenopyrite, pyrite and/or silicate.

The pretreatment of the refractory gold concentrates used as the starting material may be performed by a method selected from pressure oxidation, bioleaching and roasting, preferably pressure oxidation.

In one embodiment of the invention, the gold-bearing raw materials used as the starting material are selected from refractory gold concentrates which have been pretreated by pressure oxidation.

Method

In the gold leaching step (a), the gold-bearing raw material is subjected to oxidative chloride leaching in an aqueous leaching liquor in the following conditions:
(i) the aqueous leaching liquor contains dissolved cupric ions ($Cu^{2+}$), chloride ($Cl^-$) and bromide ($Br^-$).
(ii) pH is within a range wherein the cupric ion does not precipitate,
(iii) the oxidation potential is at least 450 mV Pt vs. Ag/AgCl,
to provide a gold-containing solution.

In the leaching also silver may be leached and therefore the gold-containing solution may optionally further contain silver.

The method further comprises
(b) a liquid/solid separation step, wherein the gold-containing solution is separated from the undissolved solid material;
(c) a gold recovery step, wherein gold is recovered from the gold-containing solution from step (b) to obtain a gold-bearing organic solution and a gold-depleted leach solution containing $Cu^{2+}$, $Cl^-$ and $Br^-$; and
(c') an evaporation step, wherein gold-depleted leach solution from step (c) containing $Cu^{2+}$, $Cl^-$ and $Br^-$ is evaporated for removing excess water; and
(d) a circulation step, wherein the gold-depleted leach solution obtained from the evaporation step containing $Cu^{2+}$, $Cl^-$ and $Br^-$ is circulated to the leaching step (a).

The oxidative chloride leaching is typically performed at atmospheric pressure. Further, the oxidative chloride leaching is typically performed at the temperature of at least 50° C., more typically at the temperature of 88-100° C.

In the oxidative chloride leaching the pH value, i.e. the range wherein the cupric ion does not precipitate, is less than 2.6, typically less than 2.2.

The oxidative chloride leaching is typically performed by providing an oxidizing source into the chloride leaching liquor. Typically, the oxidizing source is an oxygen feed, an oxygen-enriched air feed or an air feed to the solution. The purpose of the oxidizing source is to allow the copper in the solution to maintain in a 2+ ion form.

The oxidation potential is typically 450-800 mV Pt vs. Ag/AgCl, typically 450-700 mV Pt vs. Ag/AgCl.

In the leaching step, the gold ore/concentrate is introduced into the leaching liquor, which contains $Cu^{2+}$, $Cl^-$ and $Br^-$, typically in the following concentrations: 10-110 g/l $Cu^{2+}$, 50-300 g/l $Cl^-$ and 1-100 g/l Br (expressed as NaBr). Typically the leaching liquor is aqueous. Furthermore, the leaching liquor as a rule contains acid, in a typical concentration of 5-20 g/l HCl. Typically, oxygen is fed into the leaching liquor. Copper ($Cu^{2+}$) is required to provide high oxidation power in order that gold can be oxidized together with the oxygen feed. Chloride and bromide ($Cl^-$ and $Br^-$) form aqua complexes with gold so that gold is dissolved in the leaching solution. The presence of $Br^-$ in the leaching liquor enables to maintain gold in a stabile form in the liquor, in other words the presence of $Br^-$ enables the formation of a more stable complex of gold compared to if only $Cl^-$ was present. pH of the leaching liquor is kept at a level wherein the cupric ion does not precipitate. Typically the pH of the leaching liquor is less than 2.6, more typically less than 2.2. In one embodiment of the invention, the pH is less than 2.2 but higher than 1.5. It was found that only about 0.5 hours may be sufficient for gold dissolution for example from oxide-based free-milling materials and from refractory concentrates pretreated by pressure oxidation.

In a typical embodiment of the invention, the leaching liquor containing $Cu^{2+}$, $Cl^-$ and $Br^-$ is circulated gold-depleted and optionally silver-depleted leach solution obtained from subsequent steps of the method after the recovery of gold and after optional recovery of silver. Before introducing the circulated leaching solution into the leaching step, the solution is as a rule subjected to evaporation to remove excess water. It is also possible to feed only a part of the solution to the evaporation step. Another option is to feed all of the solution to the evaporation step. The portion of the solution to be evaporated can vary in a wide range, depending on the raw material type, moisture and environmental regulations. In a typical embodiment of the invention 5-99%, preferably 20-70%, more preferably 40-60% of the leaching solution is fed to the evaporation step after gold recovery step. Heat to the evaporation is typically provided by steam, live steam condensate typically returning at 90-100° C. The amount of evaporation depends on the chemical and mineralogical composition of the raw material. In one application (calculated by HSC Sim 7.1) 200 t/h evaporation was needed to balance 300 t/h free-milling ore feed into the process. The evaporated leaching solution may be introduced to the leaching as such or, if necessary, after optional regeneration. In the regeneration, the circulated leaching solution is supplemented with fresh leaching chemicals (make-up chemicals) containing $Cu^{2+}$, $Cl^-$ and $Br^-$. The addition of the make-up chemicals is suitably performed in connection with the leaching.

The present method and process arrangement are suitable for a wide variety of starting materials. By performing an evaporation step (c'), wherein part or all of the gold-depleted leach solution from step (c) containing $C^{2+}$, $Cl^-$ and $Br^-$ is evaporated for removing excess water; and a circulation step (d), wherein the gold-depleted leach solution obtained from the evaporation step containing $Cu^{2+}$, $Cl^-$ and $Br^-$ is circulated to the leaching step (a); there is no need to add additional copper ions to the process. This further enables the use of a wide variety of starting materials in a very sustainable way because no new copper is added (or needed to be present in the starting material) and therefore no copper-containing bleed to the environment is formed. Furthermore the chemicals circulation in the process is maximized resulting in savings in costs as well as small chemicals consumption. For being able to recover and recycle the chloride/bromide, water needs to be removed in order to maintain the water balance. High chloride concentrations cannot be sustainably discharged to the environment and even if this would be possible the cost of make-up chloride addition would leave the process uneconomical.

The leaching provides a gold-containing solution with a gold yield of more than 70%, preferably more than 85%, still more preferably more than 95% and even more than 98% and up to 99.7% based on solid analysis. In addition to gold, the leach solution as a rule contains silver and other components, such as e.g. arsenic, aluminium, iron, cobalt, nickel, and magnesium.

In the liquid/solid separation step (b), the gold-containing solution is separated from the solid material. The solid/liquid separation may be performed by filtering, solid/liquid settling, evaporation or centrifugation, for example.

The gold-containing solution is introduced into the gold recovery step (c), after optional washing.

The gold recovery step (c) may be performed by liquid-liquid extraction (also known as solvent extraction). The liquid-liquid extraction is performed by using an extraction agent, which is selective for gold. Typically the extractant contains a diester of 2,2,4-trialkyl-1,3-pentanediol or 2-ethylhexanol or both. In one embodiment of the invention, the liquid-liquid extraction is performed by using a diester of 2,2,4-trialkyl-1,3-pentanediol as the extraction agent. In another embodiment of the invention the liquid-liquid extraction was performed by using a diester of 2,2,4-trialkyl-1,3-pentanediol blended with 2-ethylhexanol as the extraction agent. The extraction may be performed using the method disclosed in WO 2011/154603 A1. It was found that even 99.9% gold recovery was achieved.

Gold can be stripped from the gold-bearing organic solution obtained in step (c) to obtain an aqueous gold-bearing solution. Water or an aqueous salt solution may be used as the stripping agent.

Furthermore, the method may comprise a further gold recovery step, wherein gold is recovered from the aqueous gold-bearing solution obtained above or even directly from the organic gold-bearing solution obtained in step (c). The further gold recovery step may be performed by a method selected from reduction with oxalic acid, ascorbic acid or glucose, adsorption on activated carbon, cementation and direct burning of gold bearing organic reagent. In one embodiment of the invention, the reduction of gold is performed with oxalic acid.

In the circulation step (d), the gold-depleted leach solution from step (c) containing $Cu^{2+}$, $Cl^-$ and $Br^-$ is circulated to the leaching step (a) after optional regeneration and/or after evaporation for removing excess water. Due to the efficient circulation and optional regeneration of the gold-depleted leach solution, accumulation of impurities disturbing gold dissolution is avoided. Typically solution is recycled in its entirety.

In one embodiment of the invention, the method further comprises a silver recovery step, where silver is recovered from at least part of the gold-depleted leach solution obtained from the gold recovery step (c). Naturally the silver recovery step is not necessary if silver is not present in the starting material. The silver recovery may be performed by a method selected from liquid-liquid extraction and precipitation. In one embodiment of the invention, the silver recovery comprises liquid-liquid extraction with Cyanex 471X (a commercial liquid-liquid extraction reagent where the active component is triisobutylphosphine sulphide), stripping with an aqueous thiosulfate salt solution, such as sodium thiosulfate solution, and cementation with metal powder, such as Cu powder. For the liquid-liquid extraction. Cyanex 471X is typically used as a 0.1-0.7 mol/l solution in a hydrocarbon solvent. The solution may also contain a modifier. The silver recovery may also be performed by sulphide precipitation. Silver is typically recovered with a yield of more than 70%.

In one embodiment of the invention, the gold-depleted leach solution from step (c) is circulated to the leaching step (a) after the silver recovery step.

In the following, the invention is illustrated by referring to FIG. 1, which is an exemplary embodiment of the invention where gold leaching is combined with gold recovery and further with silver recovery. The example embodiment is not meant to restrict the invention in any way. Naturally, if silver is not present in the starting material, the silver recovery step is not necessary. It should also be noted that only a part of the solution may be subjected to evaporation. A gold concentrate (Au concentrate 5) is introduced into leaching 10, together with oxygen feed 7 and a leaching solution containing Cu ($Cu^{2+}$), $Cl^-$ and $Br^-$. In the leaching 10, gold is solubilized forming a gold-containing solution. Leaching is followed by solid/liquid separation (S/L separation 20), where the gold-containing solution is separated from the undissolved solid material (leach residue 105) The gold-containing solution obtained from the leaching is introduced into mid extraction (Au extraction 30), which produces a gold-bearing organic solution and a gold-depleted leach solution containing $Cu^{2+}$, $Cl^-$ and $Br^-$. The gold-bearing organic solution is further introduced into gold stripping (Au stripping 40), where gold is stripped with water from the gold-bearing organic solution to obtain an aqueous gold-bearing solution. Gold is finally recovered as elemental gold from the aqueous gold-bearing solution by reduction with sodium oxalate (Na oxalate 45) by introducing the aqueous gold-bearing solution to reduction (Au reduction 50). The reduction product is subjected to solid/liquid separation (S/L separation 60), from which gold is recovered as a solid product (Au product 65). The liquid product from the solid/liquid separation contains some impurities, such as iron and copper. The impurities are removed from the solution (effluent treatment 70) by hydroxide precipitation. The slurry from the effluent treatment is introduced into solid/liquid separation (S/L separation 80), from which a hydroxide precipitate 85 and a solution bleed 90 are obtained.

The gold-depleted solution containing $Cu^{2+}$, $Cl^-$ and $Br^-$ from Au extraction 30 is introduced into silver recovery, comprising silver extraction (Ag extraction 100), silver stripping (Ag stripping 110), silver cementation with Cu-powder 125 (Ag cementation 120) and solid/liquid separation (S/L separation 130), from which a solid silver product (Ag product 135) is obtained. The liquid product from the solid/liquid separation 130 is introduced into effluent treatment 70 (together with the liquid product from gold recovery).

Part of the leaching solution containing $Cu^{2+}$, $Cl^-$ and $Br^-$ from the silver extraction 100 is introduced into evaporation 160 to remove excess water as steam 165. After evaporation to a suitable consistency, the remaining solution 170 containing $Cu^{2+}$, $Cl^-$ and $Br^-$ is circulated to leaching 10.

A small part of the solution from the silver extraction is introduced into effluent treatment 140, where some impurity metals such as zinc and lead are removed by hydroxide precipitation. The effluent treatment is followed by solid/liquid separation (S/L separation 150). The liquid product from the solid/liquid separation is introduced into evaporation 160. The solid product from the solid/liquid separation is recovered as a Cu—Zn precipitate 155.

The invention relates also to a process arrangement for recovering gold and optionally silver from gold-bearing raw material, wherein the arrangement comprises (a) a gold leaching unit adapted for subjecting the gold-bearing raw material to oxidative chloride leaching in a leaching liquor containing cupric ions ($Cu^{2+}$), chloride ($Cl^-$) and bromide ($Br^-$), for dissolving gold and optionally silver, (b) a liquid/solid separation unit, adapted for separating the gold- and optionally silver-containing solution from the undissolved solid material;

(c1) a gold recovery unit, adapted for recovering the gold from the gold- and optionally silver-containing solution from unit (b) to obtain a gold-bearing organic solution and a gold-depleted leach solution;

(c2) optionally a silver extraction unit adapted for recovering the silver from the gold-depleted leach solution;

(c3) an evaporation unit adapted for evaporating excess water and optionally an effluent treatment unit for treating liquid obtained from silver extraction unit; and (d) a circulation unit (d), adapted for circulating the gold-depleted leach solution containing $Cu^{2+}$, $Cl^-$ and $Br^-$ to the leaching unit (a).

It is possible to subject only a part of the solution or all of the solution to the evaporation unit.

The liquid-solid separation unit may be selected from filter, solid/liquid settler, evaporator or centrifuge, for example.

EXAMPLES

The following examples illustrate the invention without limiting the invention in any way.

In the following examples 1-3, leaching tests with different gold concentrates were carried out in order to see whether it is possible to obtain as high extraction of gold with chloride leaching as with cyanide leaching.

Example 1

Recovery of Gold from a Sulfidic Gold Concentrate

The sulfidic gold concentrate used as the starting material was a free-milling concentrate. In the concentrate, most of the gold exists as pure metal and it can be dissolved directly with cyanide. The amount of liberated gold in the material is 80.85%. The material contains also locked gold.

Chemical composition of the sulfidic concentrate is presented in Table 1.

TABLE 1

Chemical composition of sulfidic concentrate

|  | Sulfidic concentrate |
|---|---|
| Ag, ppm | 35.90 |
| Au, ppm | 114.60 |
| Cu, % | 0.94 |
| Fe, % | 41.70 |
| S, % | 46.60 |
| $SiO_2$, % | 7.84 |

Chloride-bromide leaching test conditions are presented in Table 2. The redox potential varied between 550-676 mV Pt vs. Ag/AgCl.

TABLE 2

Conditions of chloride-bromide leaching tests

|  | Solid conc., g/l | T, °C. | $[Cl^-]_{aq}$, g/l | $[NaBr]_{aq}$, g/l | $[Cu^{2+}]_{aq}$, g/l | pH | Acid conc, g/l |
|---|---|---|---|---|---|---|---|
| Test 1 | 400 | 98 | 225 | 100 | 100 | 1.7 | — |
| Test 2 | 200 | 98 | 225 | 100 | 100 | — | 10 |
| Test 3 | 200 | 98 | 225 | 100 | 50-100 | — | 10 |
| Test 4 | 200 | 98 | 225 | 10-100 | 100 | — | 10 |

The results are presented in Table 3.

TABLE 3

Extractions of gold and silver

|  | Au, % | Ag, % |
|---|---|---|
| Test 1 | 76.4 | 87.1 |
| Test 2 | 83.9 | 97.4 |
| Test 3 | 78.4 | 96.5 |
| Test 4 | 74.4 | 94.0 |

Furthermore, the effect of copper concentration on gold dissolution was studied in test 3. During the test, the copper concentration was increased step by step. Used copper concentrations were 50 g/l, 67 g/l, 83 g/l, and 100 g/l. Addition of copper was made every two hours.

The copper concentration affected gold dissolution. 50 g/l copper dissolved part of gold in half hour (FIG. 2). Higher copper concentrations increased gold dissolution.

Additionally, the effect of bromide concentration on gold dissolution was studied in test 4. The sodium bromide concentration was changed every second hours. The sodium bromide concentration effected dissolution of gold (FIG. 3). Kinetics of gold dissolution was faster with higher bromide concentrations.

Relatively good extractions of gold (83.9%) were obtained with chloride-bromide leaching. Kinetics was fast.

Example 2

Recovery of Gold from a Silicate Based Gold Ore

The silicate based gold ore used as the starting material was also a free-milling ore.

The chemical analyses of the ore is presented in Table 4.

TABLE 4

Chemical analysis of the used gold ore

|  | Silicate based ore |
|---|---|
| Al, % | 5.61 |
| Au, ppm | 5.054 |
| Cu, % | 0.025 |
| Fe, % | 0.851 |
| $SiO_2$, % | 51.3 |

Chloride-bromide leaching test conditions are presented in Table 5. The redox potential varied between 450-682 mV Pt vs. Ag/AgCl.

TABLE 5

Conditions of chloride-bromide leaching tests

|  | Solid conc., g/l | T, °C. | $[Cl^-]_{aq}$, g/l | $[NaBr]_{aq}$, g/l | $[Cu^{2+}]_{aq}$, g/l | pH | Acid conc, g/l |
|---|---|---|---|---|---|---|---|
| Test 1 | 200 | 98 | 225 | 100 | 100 | 1.7 | — |
| Test 2 | 400 | 98 | 225 | 100 | 100 | 1.7 | — |
| Test 3 | 400 | 98 | 133-197 | 100 | 0-75 | 1.7 | — |
| Test 4 | 400 | 98 | 225 | 1-60 | 100 | 1.7 | — |
| Test 5 | 400 | 93 | 26-125 | 15 | 50 | 1.7 | — |
| Test 6 | 400 | 90 | 150 | 8 | 15 | — | 10 |

A cyanide leaching test for comparison purposes was carried out in the following conditions: solid concentration 33 w-%, pH 11, air feed 500 ml/mm. NaCN concentration 3 g/l, and leaching time 24 h.

The results from all tests are presented in Table 6.

TABLE 6

Gold extractions in chloride-bromide leaching tests and cyanide leaching test.

|  | Au, % |
| --- | --- |
| Test 1 | 98.6 |
| Test 2 | 98.4 |
| Test 3 | 91.0 |
| Test 4 | 97.0 |
| Test 5 | 100.0 |
| Test 6 | 95.1 |
| Cyanide | 98.0 |

Furthermore, the gold concentration of the solution vs. leaching time is presented in FIG. 4.

In test 3, the effect of copper concentration was also studied. During the leaching, copper concentration had to be so high that redox potential is over 450 mV Pt vs. Ag/AgCl. Copper concentration was increased step by step from 0 g/l to 75 g/l during the test. Used concentrations were 0, 1, 10, 30, 60, and 75 g/l. It seems that 10 copper was a sufficiently high concentration for gold dissolution (FIG. 5). Required copper concentration depends on the mineralogy of feed material.

Additionally, the effect of sodium bromide concentration on gold dissolution was studied in test 4 (FIG. 6). Used sodium bromide concentrations were 0, 1, 5, 10, 40, and 60 g/l.

Furthermore, the effect of chloride concentration on gold dissolution was studied (FIG. 7). Chloride concentration 100 g/l increased dissolution of gold. 25 g/l chloride dissolved some of the gold, but most of gold remained in solid. Leaching of gold needed quite high chloride concentrations. According to the test 5, a suitable chloride concentration would be at least 125 g/l for this material. Extraction of gold was 99.98%.

Results of the cyanide leaching test are presented in FIG. 8. Extraction of gold was 98.0% for the used silicate based gold ore.

During the leaching tests it was found that the mineral composition of the material as well as copper, bromide, chloride and acid concentrations affect the gold leaching. Relatively good extractions of gold (over 95%, Table 6) were obtained with chloride-bromide leaching. Kinetics was fast in chloride-bromide leaching. In cyanide leaching, the retention time was 24 hours. After 25 hours, the extraction of gold was 98%.

The chloride leaching was possible with low copper and sodium bromide concentrations. The temperature needs to be at least 90° C.

Example 3

Recovery of Gold from Pretreated Refractory Gold Concentrate

In the used concentrate, most of the gold is inside sulfide minerals.

The chemical composition of the used refractory gold concentrate before pretreatment is presented in Table 7. The gold is mostly locked in pyrite.

TABLE 7

Chemical composition of the used refractory concentrate

|  | Test material |
| --- | --- |
| Ag, ppm | 19.6 |
| Au, ppm | 29.4 |
| As, % | 6.9 |
| Cu, % | 0.062 |
| Fe, % | 31.3 |
| S, % | 32.7 |
| $SiO_2$, % | 12.7 |

Chloride-bromide leaching test conditions are presented in Table 8. The redox potential varied between 568-681 mV Pt vs. Ag/AgCl. In tests 1-2, the material was pretreated with POX (pressure oxidation). POX treatments were made in the following conditions: solid concentration was 150-300 g/l, temperature was 210° C., and the oxygen overpressure was 6 bar (total pressure was about 26 bar). After POX treatment, hot cure treatment was done. The temperature was decreased to 90° C. and the overpressure was released (to atmospheric pressure).

TABLE 8

Conditions of chloride-bromide leaching tests

| | Solid conc., g/l | T, ° C. | $[Cl^-]_{aq}$, g/l | $[NaBr]_{aq}$, g/l | $[Cu^{2+}]_{aq}$, g/l | pH | Acid conc, g/l |
| --- | --- | --- | --- | --- | --- | --- | --- |
| Test 1 | 50 | 98 | 225 | 100 | 100 | 1.7 | — |
| Test 2 | 315 | 98 | 150 | 8-100 | 20 | — | 10 |

The chloride-bromide leaching results are presented in Table 9.

TABLE 10

Extractions of gold and silver in chloride-bromide leaching

|  | Au(s), % | Ag(s), % |
| --- | --- | --- |
| Test 1 | 99.5 | — |
| Test 2 | 99.7 | 97.3 |

Relatively good extractions of gold (over 99%) and silver (about 97%) were obtained with chloride-bromide leaching for POX treated material. In test 2 (FIG. 9), the effect of sodium bromide concentration was also studied. Sodium bromide concentration did not affect gold extraction in the sodium bromide concentration range used in this case. In FIG. 9, the gold concentration of the solution varied widely depending on solid concentration and the amount of solid.

Example 4

Gold leaching was modeled using HSC SIM 7.1 process simulation program for free-milling ore with 300 t/h ore feed into the chloride-bromide leaching. Process parameters similar to the patent examples were used.

A feature of a chloride based gold processes is that chloride/bromide concentration is kept high. This is needed to keep gold stable in the solution.

Hence to recover and recycle the chloride/bromide, water need to be removed in order to maintain the water balance. High chloride concentrations often cannot be sustainably discharged to the environment but even if it could, the cost of make-up chloride addition would leave the process uneconomic.

For that reason the evaporation and water balance is an essential innovative feature of the process which makes the process environmentally and economically sustainable.

It was observed that with 300 t/h ore feed, 203 t/h of water accumulated into the process e.g. without evaporation stage >200 m³/h of solution with high chloride and bromide concentrations should be bled out of the process. This would be not environmentally sustainable. Evaporation stage (evaporation 203 t/h water) allows the chemicals such as Cl, Br and also Cu to be recycled and reused in the process. Then only pure water (vapor) is released and can be used in the process if needed.

It will be obvious to a person skilled in the art that, as the technology advances, the inventive concept can be implemented in various ways. The invention and its embodiments are not limited to the examples described above but may vary within the scope of the claims.

The invention claimed is:

1. A method of preparing a gold-containing solution from gold-bearing raw materials, wherein the method comprises
    (a) a gold leaching step, wherein the gold-bearing raw material is subjected to oxidative chloride leaching in an aqueous leaching liquor in the following conditions:
        (i) the aqueous leaching liquor contains dissolved cupric ions ($Cu^{2+}$), chloride ($Cl^-$) and bromide ($Br^-$),
        (ii) pH is within a range wherein the cupric ion does not precipitate, and
        (iii) the oxidation potential is at least 450 mV Pt vs. Ag/AgCl, to provide a gold-containing solution optionally further containing silver,
    (b) a liquid/solid separation step, wherein the gold-containing solution is separated from undissolved solid material;
    (c) a gold recovery step, wherein gold is recovered from the gold-containing solution from step (b) to obtain a gold-bearing organic solution and a gold-depleted leach solution containing $Cu^{2+}$, $Cl^-$ and $Br^-$; and
    (c') an evaporation step, wherein gold-depleted leach solution from step (c) containing $Cu^{2+}$, $Cl^-$ and $Br^-$ is evaporated for removing excess water; and
    (d) a circulation step, wherein the gold-depleted leach solution obtained from the evaporation step containing $Cu^{2+}$, $Cl^-$ and $Br^-$ is circulated to the leaching step (a).

2. The method as claimed in claim 1, wherein the gold-bearing raw material is selected from ores, concentrates, scraps, recycled materials, leach residues, tailings, flotation tailings, and refractory gold materials, which refractory gold materials have been pretreated by pressure oxidation, roasting and/or bacterial leaching.

3. The method as claimed in claim 1, wherein free-milling gold ores/concentrates and pretreated refractory gold concentrates are used as the raw material and they have been selected from sulfidic and oxidic materials.

4. The method of claim 1, wherein the gold-bearing raw material is selected from refractory gold concentrates and the pretreatment of the refractory gold concentrates used as the raw material has been performed by a method selected from pressure oxidation, bioleaching and roasting.

5. The method of claim 4, wherein the pretreatment of the refractory gold concentrates used as the raw material has been performed by pressure oxidation.

6. The method of claim 1, wherein the gold-bearing raw material is selected from refractory gold concentrates which have been pretreated by pressure oxidation.

7. The method of claim 1, wherein the oxidative chloride leaching is performed at atmospheric pressure.

8. The method of claim 1, wherein the oxidative chloride leaching is performed at the temperature of at least 50° C.

9. The method of claim 1, wherein the pH value wherein the cupric ion does not precipitate is less than 2.6.

10. The method of claim 1, wherein the oxidative chloride leaching is performed by providing an oxidizing source.

11. The method as claimed in claim 10, wherein the oxidizing source is an oxygen feed, an oxygen-enriched air feed or an air feed to the solution.

12. The method of claim 1, wherein the oxidation potential is 450-800 mV Pt vs. Ag/AgCl.

13. The method of claim 12, wherein the oxidation potential is 450-700 mV Pt vs. Ag/AgCl.

14. The method of claim 1, wherein the concentrations of $Cu^{2+}$, $Cl^-$ and $Br^-$ in the leaching liquor are 10 110 g/l $Cu^{2+}$, 50-300 g/l $Cl^-$ and 1-100 g/l $Br^-$ expressed as NaBr.

15. The method of claim 1, wherein the acid concentration of the leaching liquor is 5-20 g/l HCl.

16. The method of claim 1, wherein the gold recovery step (c) is performed by liquid-liquid extraction.

17. The method according to claim 16 wherein the extractant contains a diester of 2,2,4-trialkyl-1,3-pentanediol or 2-ethylhexanol or both.

18. The method of claim 1, wherein the method further comprises a gold stripping step, wherein gold is stripped from the gold-bearing organic solution obtained in step (c) to obtain an aqueous gold-bearing solution.

19. The method of claim 1, wherein the method comprises a further gold recovery step, wherein gold is recovered from the gold-bearing organic solution or from an aqueous gold-bearing solution.

20. The method as claimed in claim 19, wherein the said further gold recovery step is performed by a method selected from reduction with oxalic acid, ascorbic acid or glucose, adsorption on activated carbon, cementation and direct burning of the gold-bearing organic reagent.

21. The method of claim 1, wherein a part of the leaching solution is fed to the evaporation step or wherein all of the leaching solution is fed to the evaporation step.

22. The method as claimed in claim 21, wherein 5-99 wt-% of mass of the leaching solution is fed to the evaporation step after gold recovery step.

23. The method of claim 1, wherein the method further comprises a silver recovery step, where silver is recovered from at least part of the gold-depleted leach solution obtained from the gold recovery step (c).

24. The method as claimed in claim 23, wherein the silver recovery step comprises a method selected from liquid-liquid extraction and precipitation.

25. The method of claim 24, wherein the silver recovery step comprises liquid-liquid extraction with triisobutylphosphine sulphide, stripping with an aqueous thiosulfate salt solution and cementation of silver from the thiosulfate solution with metal powder.

26. The method as claimed in claim 24, wherein the silver recovery step comprises sulfide precipitation.

27. The method as claimed in 23, wherein the gold-depleted leach solution from step (c) is returned to the leaching step (a) after the silver recovery step.

\* \* \* \* \*

UNITED STATES PATENT AND TRADEMARK OFFICE
CERTIFICATE OF CORRECTION

PATENT NO. : 10,060,007 B2  
APPLICATION NO. : 14/787404  
DATED : August 28, 2018  
INVENTOR(S) : Ville Miettinen Page 1 of 1

It is certified that error appears in the above-identified patent and that said Letters Patent is hereby corrected as shown below:

In the Specification

Column 2, Line 22 "...less than 1 but greater 0.2 are disclosed." should be -- ...less than 1 but greater than 0.2 are disclosed. --

Column 2, Line 23 "...may be recovered from the each solution..." should be -- ...may be recovered from the leach solution... --

Column 2, Line 24 "...or by on exchange, solvent..." should be -- ...or by ion exchange, solvent... --

Column 2, Line 39 "...of either copper or bromide on or both together..." should be -- ...of either copper or bromide ion or both together... --

Column 3, Line 58 "...the gold concentration in the each solution..." should be -- ...the gold concentration in the leach solution... --

Column 4, Line 11 "...concentration in the each solution..." should be -- ...concentration in the leach solution... --

Column 8, Line 14 "...introduced into mid extraction..." should be -- ...introduced into gold extraction... --

Column 11, Line 24 "It seems that 10 copper was a sufficiently..." should be -- It seems that 10 g/l copper was a sufficiently... --

Column 12, Line 63 "...need to be removed..." should be -- needs to be removed... --

Column 13, Line 8 "...be not environmentally sustainable." should be -- "...not be environmentally sustainable. --

Signed and Sealed this  
Eleventh Day of December, 2018

Andrei Iancu  
*Director of the United States Patent and Trademark Office*